(12) United States Patent
Cha et al.

(10) Patent No.: US 8,060,765 B1
(45) Date of Patent: Nov. 15, 2011

(54) POWER ESTIMATION BASED ON BLOCK ACTIVITY

(75) Inventors: Hungse Cha, Cedar Park, TX (US);
Robert J. Hasslen, III, Menlo Park, CA (US); John A. Robinson, Cupertino, CA (US); Sean J. Treichler, Mountain View, CA (US); Abdulkadir Utku Diril, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1064 days.

(21) Appl. No.: 11/556,117

(22) Filed: Nov. 2, 2006

(51) Int. Cl.
*G06F 1/32* (2006.01)
*G06F 1/26* (2006.01)
*G06F 1/00* (2006.01)

(52) U.S. Cl. ........ 713/322; 713/300; 713/310; 713/320; 713/321; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 5,719,800 A | * | 2/1998 | Mittal et al. | 713/321 |
| 6,564,328 B1 | * | 5/2003 | Grochowski et al. | 713/320 |
| 6,775,787 B2 | * | 8/2004 | Greene | 713/340 |
| 6,822,478 B2 | * | 11/2004 | Elappuparackal | 326/46 |
| 6,895,520 B1 | * | 5/2005 | Altmejd et al. | 713/324 |
| 7,096,145 B2 | * | 8/2006 | Orenstien et al. | 702/132 |
| 7,174,194 B2 | * | 2/2007 | Chauvel et al. | 455/574 |
| 7,421,591 B2 | * | 9/2008 | Sultenfuss et al. | 713/300 |
| 7,437,581 B2 | * | 10/2008 | Grochowski et al. | 713/320 |
| 7,457,971 B2 | * | 11/2008 | Pineda De Gyvez et al. | 713/300 |
| 2005/0044429 A1 | * | 2/2005 | Gaskins et al. | 713/300 |

FOREIGN PATENT DOCUMENTS

WO   WO 2004/107144   * 12/2004

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Thomas Lee
*Assistant Examiner* — Fahmida Rahman
(74) *Attorney, Agent, or Firm* — Patterson & Sheridan, LLP

(57) ABSTRACT

A power monitor for electronic devices, such as computer chips, is used to estimate the power consumption and to compare the estimated power consumption against the power budget. The estimated power consumption is based on activity signals from various functional blocks of the computer chip. The activity signals that are monitored correlate accurately to the total number of flip-flops that are active at a given time. If the estimated power consumption exceeds the power budget, the speed of the clock signals supplied to the computer chip is reduced.

20 Claims, 5 Drawing Sheets

POWER ESTIMATION BASED ON BLOCK ACTIVITY

FIELD OF THE INVENTION

The present invention relates generally to power estimation, and more specifically, to estimating power usage by electronic devices, such as computer chips, based on block activity.

BACKGROUND

The power supply in a conventional computer system is designed to be large enough to supply sufficient power needed by various computer chips of the computer system. Because of the rapid fluctuations in the power used by a computer chip, the power made available to each computer chip is generally maintained at a level that is higher than the average power used by the computer chip. This margin assures that the power used by the computer chip will always be less than the power made available to it.

FIG. 1 illustrates this principle. In FIG. 1, curve 110 represents the power used by a computer chip, and line 120 represents the power made available to the computer chip by the power supply. The space 130 between line 120 and curve 110 represents the excess power made available to the computer chip. It is desirable to minimize the space 130, as this would allow a smaller and thus a less expensive power supply to be used, or otherwise permit the computer chip to operate at higher power levels. However, doing so may increase the number of instances where the power used by the computer chip is greater than the power supplied to it. If line 120 represents the maximum power output of the power supply, such a condition, especially when sustained over a prolonged period of time, is likely to cause power failure.

Therefore, what is needed is a way to monitor the computer chip power usage and reduce its clock speed when its power usage exceeds the power made available to it so that the space 130 can be minimized. Analog, off-chip and on-chip power monitors are available in the prior art, but they are slow and add cost and complexity.

SUMMARY OF THE INVENTION

The present invention provides an improved power monitor for electronic devices, such as computer chips. The power monitor according to embodiments of the present invention employs an on-chip, all digital method of indirectly monitoring power usage. Through this method, the power estimate is obtained dynamically and supplied to a clock manager in real-time, which controls the clock speed of the computer chip to ensure that the power consumed by the computer chip is within the power budget. In addition, the power estimate that is obtained through this method may also be supplied to a power supply controller to allow the power supply to respond to sudden increases in power demand more quickly. As a result, the power supply experiences less voltage droop and the size and/or quantity of decoupling capacitors that have been used conventionally to make up for transient power deficiencies can be made smaller.

Power usage of an electronic device is estimated in accordance with embodiments of the present invention, based on the combined activity of the various functional blocks of the electronic device, in particular the number of flip-flops that are active in each block at a given time. The number of active flip-flops in a particular block is estimated by monitoring a representative set of enable signals supplied to the flip-flops. The selection of the enable signals to be included in the representative set is made based on various factors. One factor that is evaluated in determining the selection is the correlation of the enable signal to the total power usage of the block as determined from simulations. Another factor is the number of flip-flops controlled by the enable signals.

After selecting the enable signals for inclusion in the representative set, weighting factors are determined for the enable signals in that representative set. The weighting factors for the enable signals are primarily determined from the load on the enable signals. For each block, the enable signals in the representative set, as scaled by the weighting factors, are summed up, and a scale factor for that block is applied to that sum. The scale factor for each block represents that block's contribution to the total power consumption relative to the other blocks. The scaled sums are then added together to yield an interim power usage estimate. This interim power usage estimate is generated for a fixed number of clock cycles and then averaged. The averaged value represents the power usage estimate that is supplied to the clock manager and the power supply controller.

The clock manager compares the power usage estimate with one or more threshold values to generate control signals for a clock divider that generates an output clock, which represents the clock for the computer chip, by dividing its input clock by powers of N, e.g., powers of two. The first control input to the clock divider sets an integer number >1 that specifies the power-of-N value. The second control input sets the ratio of the amount of time the clock divider is to operate normally versus the amount of time the clock divider is to operate with clock division.

The power supply controller determines the rate of increase in the power usage estimate and compares this rate with a threshold rate. When the rate of increase in the power usage estimate is greater than the threshold rate, the power supply controller outputs a control signal to the power supply. This feature allows the power supply to respond to sudden increases in power demand with reduced time delay and reduced voltage droops in the power supply.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

Figure 1:
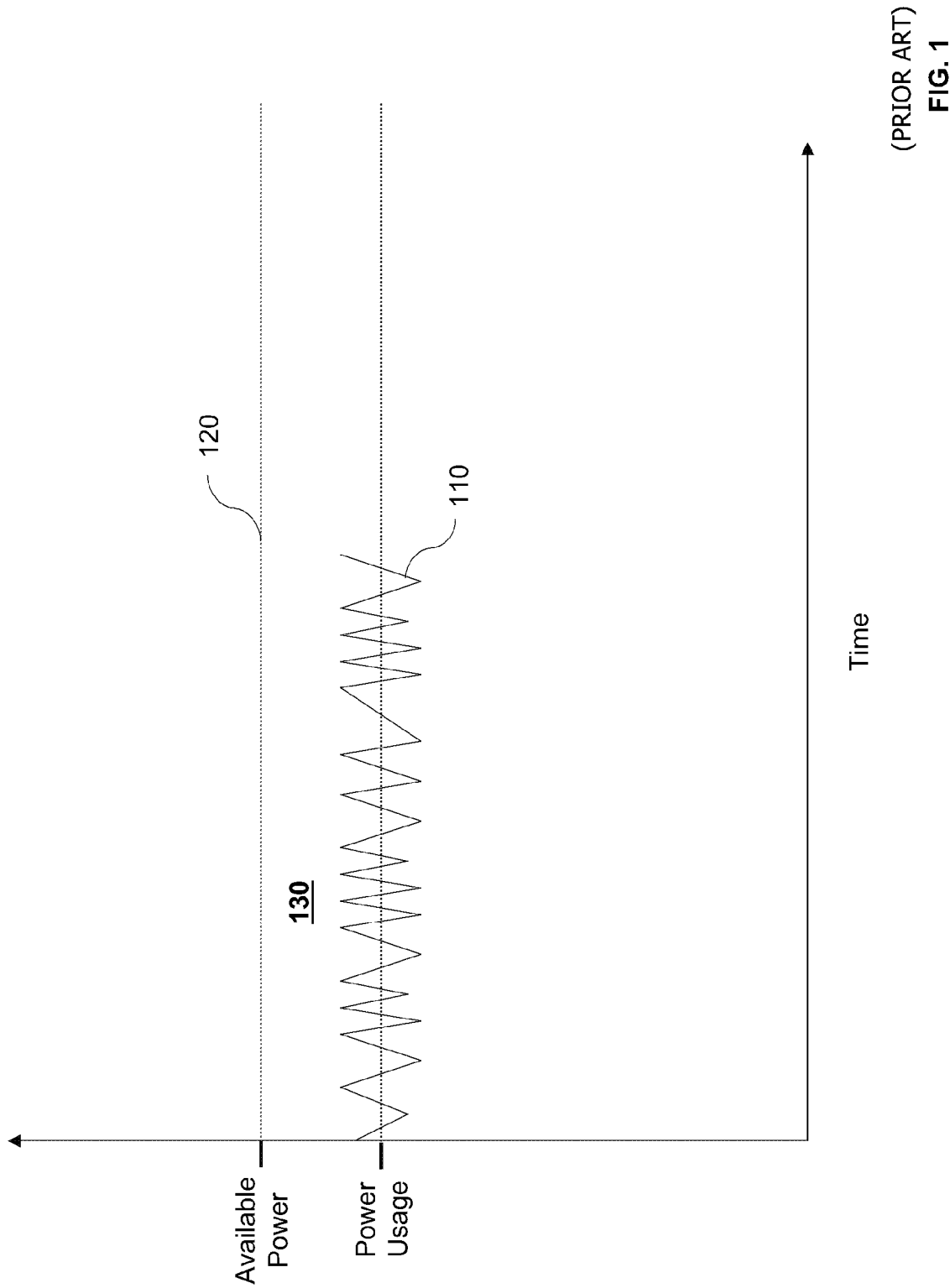
FIG. 1 is a graph showing the power usage levels of a computer chip against available power.
Figure 2:
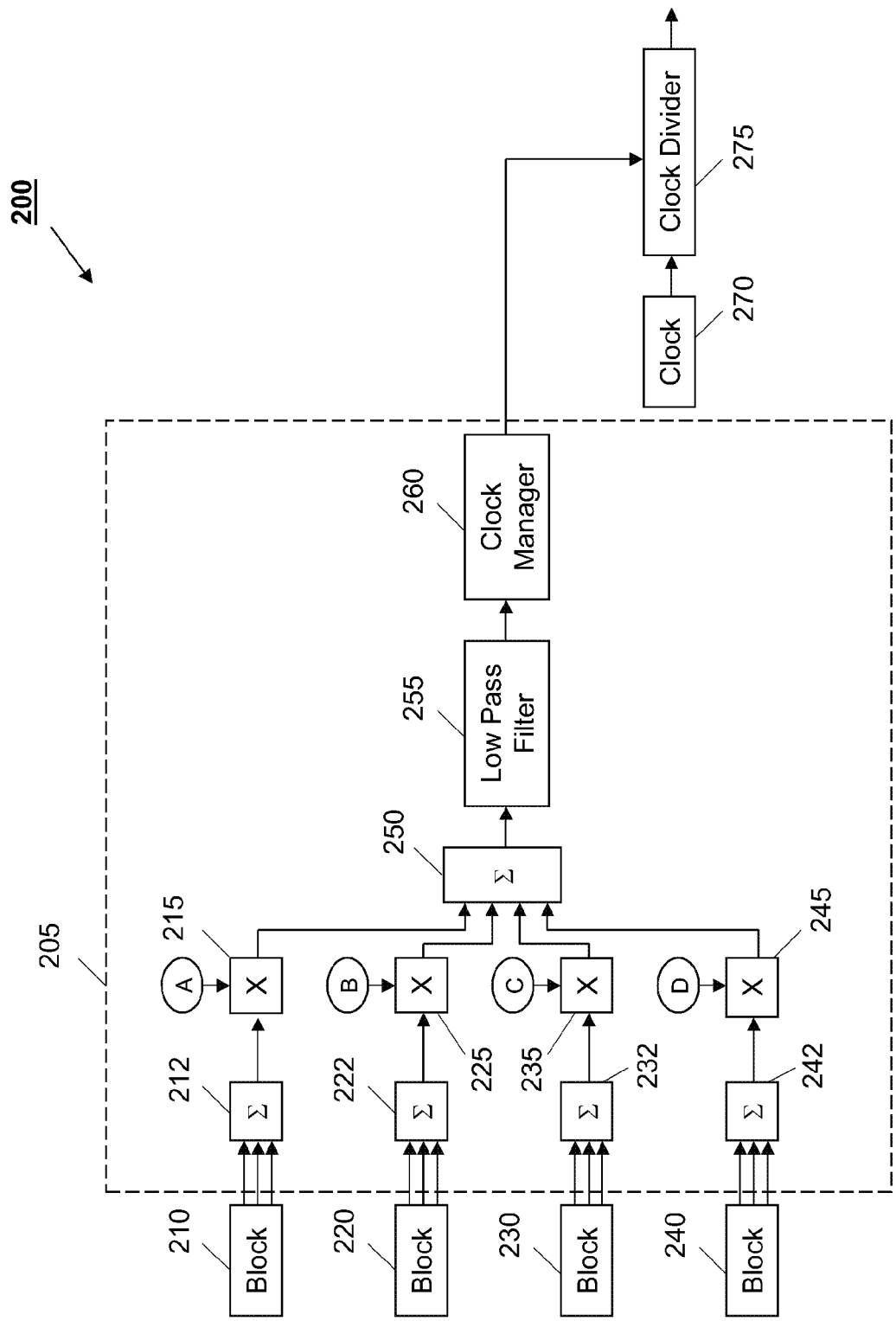
FIG. 2 is a block diagram of a power management system for a computing device according to a first embodiment of the present invention.

FIG. 2 is a block diagram of a power management system 200 for a computing device and illustrates functional blocks 210, 220, 230, 240 of a computer chip of the computing device (e.g., a graphics processing unit), a power monitor 205 for the computer chip, a clock source 270 for the computer chip, and a clock divider 275. In the embodiment of the present invention illustrated herein, the power monitor 205 is integrated with the computer chip so as to be on-chip and supplies control signals to the clock divider 275. The control signals to the clock divider 275 reduce the speed of the clock from the clock source 270 to keep the power usage by the computer chip within the power budget.

The computer chip whose power usage is being monitored is illustrated in FIG. 2 as having block 210, block 220, block 230, and block 240. Although the computer chip illustrated in this example has four blocks, the present invention is applicable to computer chips with any number of blocks, even one. Each of the blocks 210, 220, 230, 240 is governed by a clock that is output from the clock divider 275. When the power usage of the computer chip, as estimated by the power monitor 205, exceeds the power budget, the clock supplied to the blocks 210, 220, 230, 240 is throttled using the clock divider 275. The clock divider 275 provides the clock throttling by dividing the clock speed output by the clock source 270 by powers of 2. In this embodiment, the clock divider divides the clock by powers of 2. However, the present invention may be practiced with any clock divider so long as it divides the clock by powers of N that is greater than 1.

In the embodiments of the present invention, power usage is estimated based on the combined activity of the blocks 210, 220, 230, 240, namely the number of flip-flops that are active in the blocks at a given time. This approach has been adopted, because simulations have shown that the power consumed by a block is highly correlated to the number of the block's flip-flops that are active at a given time. One way of estimating the number of active flip-flops is to add up the enable signals supplied to the flip-flops weighted by the number of flip-flops that are controlled by each of these enable signals.

The embodiment of the present invention shown in FIG. 2 implements the concept described above by monitoring a representative set of enable signals supplied to the flip-flops for each of the blocks 210, 220, 230, 240. Typically, the number of enable signals in the representative set is around 10 to 20. The selection of the enable signals to be included in the representative set is made based on various factors. One factor that is evaluated in determining the selection is the correlation of the enable signal to the total power usage of the block as determined from simulations. The ones with the higher correlations are favored in the selection. Another factor is the number of flip-flops controlled by the enable signals. The ones that control higher number of flip-flops are favored in the selection.

After selecting the enable signals for inclusion in the representative set, weighting factors are determined for the enable signals in that representative set. The weighting factors for the enable signals primarily determined from the load on the enable signals. For example, an enable signal that controls twice as many flip-flops as another enable signal in the same representative set will generally have a weighting factor that is twice that of the other enable signal.

For each of the blocks 210, 220, 230, 240, the enable signals in the representative set, as scaled by the weighting factors, are summed up by a corresponding one of the summation units 212, 222, 232, 242. After this sum is determined, a corresponding scale factor (A, B, C, D) is applied to that sum through one of the multiply units 214, 224, 234, 244. The scale factor for a block represents that block's contribution to the total power consumption relative to the other blocks. The outputs from the multiply units 214, 224, 234, 244 are then summed at the summation unit 250. A low pass filter 255 is used to produce an average of the outputs of the summation unit 250 over a fixed period, e.g., 500 clocks. A clock manager 260 receives the averaged result and compares it against one or more threshold values to determine whether the estimated power usage, represented by the averaged result, exceeds the power budget.

Before the power monitor 205 can be used, the scale factors A, B, C, D and a scale factor for the threshold values used by the clock manager 260 need to be determined through calibration. The calibration is performed by running simulations. The scale factors A, B, C, D are adjusted so that the relative power consumption values for blocks 210, 220, 230, 240, as estimated, matches the relative power consumption values for blocks 210, 220, 230, 240, as simulated. The scale factor for the threshold values used by the clock manager 260 is set to be: power consumption by the blocks 210, 220, 230, 240, as estimated, divided by power consumption by the blocks 210, 220, 230, 240, as simulated.

The clock manager 260 may use a single threshold value or multiple threshold values. These threshold values and other values used by the clock manager 260 (e.g., DEC and INC values referenced below) are programmably set by the BIOS. In the case where an upper threshold (upper_threshold) and a lower threshold (lower_threshold) are used, the algorithm for adjusting the clock speed is as follows:

If power_estimate>upper_threshold, clock speed is reduced to a programmable percentage of the maximum speed.

Once clock is slowed, if power_estimate<lower_threshold, clock speed is adjusted to the maximum speed.

In the case where there are five thresholds (upper2, upper1, upper_target, lower_target, lower1), where upper2>=upper1>=upper_target>=lower_target>=lower1, the goal of the algorithm for adjusting the clock speed is to keep the power_estimate between lower_target and upper_target thresholds. The algorithm is as follows:

If power_estimate>upper2, clock speed is decreased by DEC2.

If upper2>power_estimate>upper1, clock speed is decreased by DEC1.

If upper 1>power_estimate>upper_target, clock speed is decreased by DEC0.

If upper_target>power_estimate>lower_target, no adjustment is made to clock speed.

If lower_target>power_estimate>lower1, clock speed is increased by INC0.

If lower1>power_estimate, clock speed is increased by INC1.

The clock manager 260 controls the clock speed using two control inputs to the clock divider 275. The first control input sets an integer number >1 that specifies the power-of-two input for the clock divider 275. For example, if this number is 1, then the clock divider 275 divides the clock by two, and if this number is 2, then the clock divider 275 divides the clock by four, and so forth. The second control input sets the ratio of the amount of time the clock divider 275 is to operate normally versus the amount of time the clock divider 275 is to operate with clock division. With these two control inputs, the clock manager 260 can adjust the clock speed rapidly to any desired effective clock speed.

Figure 3:
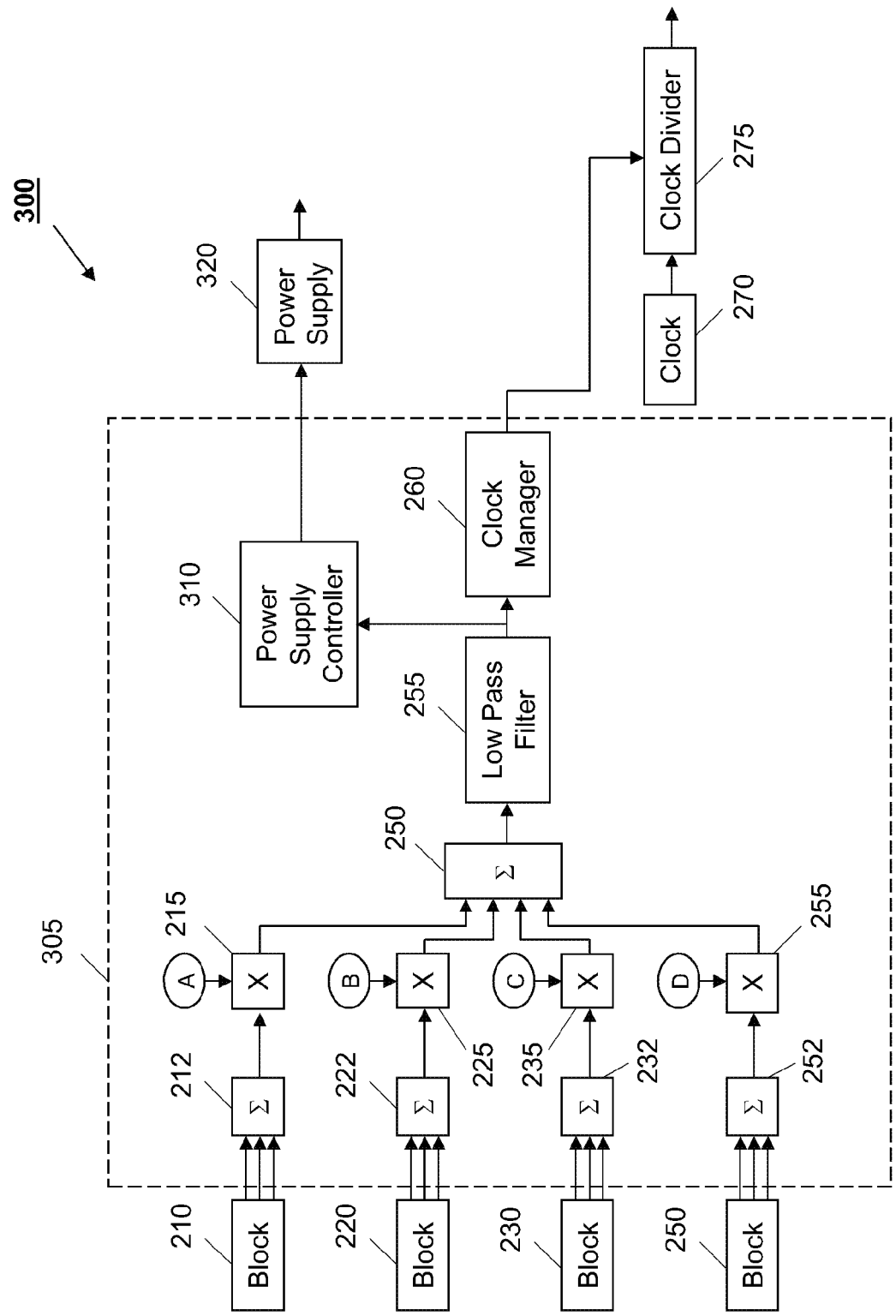
FIG. 3 is a block diagram of a power management system for a computing device according to a second embodiment of the present invention.

FIG. 3 is a simplified block diagram of a power management system 300 for a computing device according to a second embodiment of the present invention. FIG. 3 is identical to FIG. 2 except that the power monitor 305, through a power supply controller 310, outputs a control signal to the power supply 320 that indicates that the power consumption by the blocks 210, 220, 230, 240 is increasing rapidly. This control signal is generated by the power supply controller 310 when it determines from the averaged results output from the low pass filter 255 that the rate of increase of the power consumption is greater than a threshold rate. This feature allows the power supply 320 to respond to sudden increases in power demand with reduced time delay and reduced voltage droops in the power supply 320. As a result, decoupling capacitors used in this embodiment of the present invention can be made smaller than in the prior art.

Figure 4:
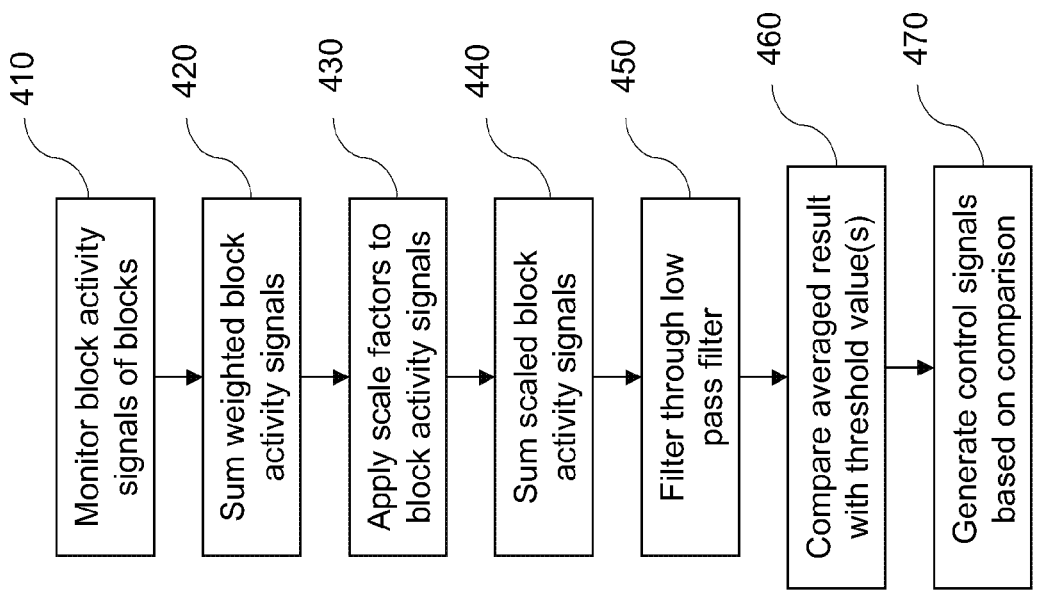
FIG. 4 is a flow diagram illustrating the method steps carried out by the power management system of either FIG. 2 or FIG. 3.

FIG. 4 is a flow diagram illustrating the method steps carried out by the power management system of either FIG. 2 or FIG. 3. In step 410, block activity signals, corresponding to enable signals of a representative set, are monitored separately for each of the functional blocks 210, 220, 230, 240. An appropriate weighting factor is applied to each individual block activity signal in a representative set to account for the difference in the power consumed by the flip-flops associated with that block activity signal relative to the power consumed by flip-flops associated with other block activity signals within the same representative set. The block activity signals from each of the blocks 210, 220, 230, 240, as weighted, are then summed (step 420). Then, in step 430, scale factors A, B, C, D are applied respectively to the summed results of the blocks 210, 220, 230, 240, so that they accurately represent the relative power usage of the blocks as compared to other blocks. The scaled values are then summed (step 440). The resulting sum from step 440 is filtered using a low pass filter so that an averaged result can be obtained over a fixed period of time, e.g., 500 clocks (step 450). In step 460, the averaged result is compared against one or more threshold values by the clock manager 260 and the power supply controller 310. Then, in step 470, control signals for the clock divider 275 and the power supply 320 are generated based on the comparison result.

Figure 5:
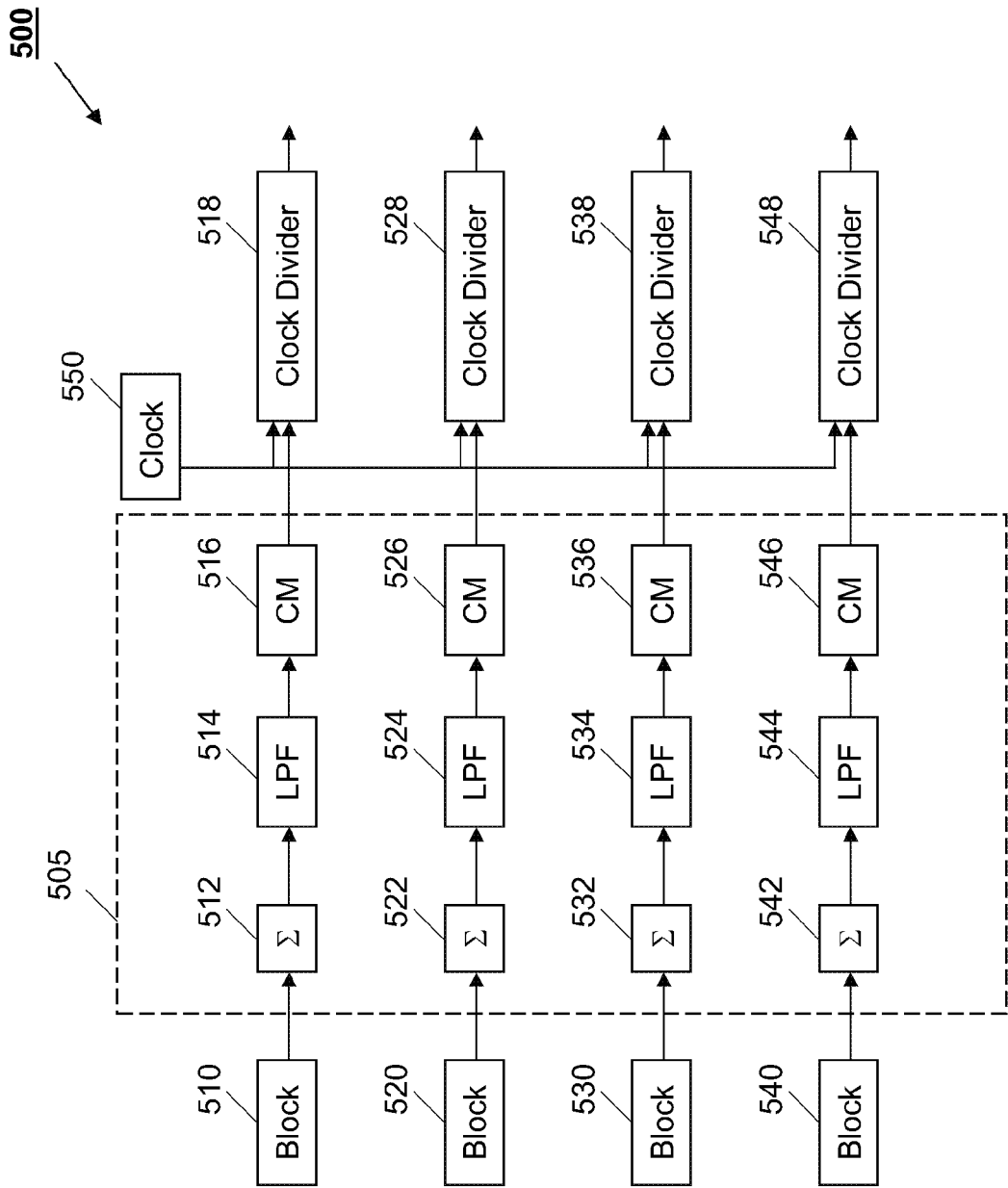
FIG. 5 is a block diagram of a power management system for a computing device according to a third embodiment of the present invention.

FIG. 5 is a block diagram of a power management system 500 for a computing device and illustrates functional blocks 510, 520, 530, 540 of a computer chip (e.g., a graphics processing unit), a power monitor 505 for the computer chip, a clock source 550 for the computer chip, and clock dividers 518, 528, 538, 548. In the embodiment of the present invention illustrated herein, the power monitor 505 is integrated with the computer chip so as to be on-chip, and supplies control signals to the clock dividers 518, 528, 538, 548. The control signals to the clock dividers 518, 528, 538, 548 reduce the speed of the clock from the clock source 550 to keep the power usage by the computer chip within the power budget.

The computer chip whose power usage is being monitored is illustrated in FIG. 5 as having block 510, block 520, block 530, and block 540. Although the computer chip illustrated in this example has four blocks, the present invention is applicable to computer chips with any number of blocks, even one. Each of the blocks 510, 520, 530, 540 is governed by a separate clock that is output from a corresponding one of the clock dividers 518, 528, 538, 548. The output of the clock divider 518 is the clock for block 510. The output of the clock divider 528 is the clock for block 520. The output of the clock divider 538 is the clock for block 530. The output of the clock divider 548 is the clock for block 540. When the power usage estimated by the power monitor 505 indicates that the power consumed by any block exceeds the power budget for that block, the clock supplied to that block is throttled using the corresponding one of the clock dividers 518, 528, 538, 548. Each of the clock dividers 518, 528, 538, 548 provides clock throttling by dividing the clock speed output by the clock source 450 by powers of 2.

As in the power monitor 205, the power monitor 505 monitors a representative set of enable signals for each of the blocks 510, 520, 530, 540. For each of the blocks 510, 520, 530, 540, the enable signals in the representative set, as scaled by the weighting factors, are summed up by a corresponding one of the summation units 512, 522, 532, 542. After this sum is determined for each of the blocks 510, 520, 530, 540, it is averaged over a fixed period of time, e.g., 500 clocks, using a corresponding one of low pass filters (LPFs) 514, 524, 534, 544. Clock managers (CMs) 516, 526, 536, 546 then receive the averaged results and compare them against threshold values to determine whether the estimated power usage for any block exceeds the power budget for that block.

Before the power monitor 505 can be used, the scale factors for the threshold values used by the clock managers 516, 526, 536, 546 need to be determined through calibration. The calibration is performed by running simulations. The scale factor for the threshold values is respectively set to be: power consumption by the blocks 210, 220, 230, 240, as estimated, divided by power consumption by the blocks 210, 220, 230, 240, as simulated.

As in the power management system 200, the clock managers 516, 526, 536, 546 may use a single threshold value or multiple threshold values. These threshold values and other values used by the clock managers 516, 526, 536, 546 (e.g., DEC and INC values referenced below) are programmably set by the BIOS. In the case where an upper threshold (upper_threshold) and a lower threshold (lower_threshold) are used, the algorithm for adjusting the clock speed is as follows:

If power_estimate>upper_threshold, clock speed is reduced to a programmable percentage of the maximum speed.

Once clock is slowed, if power_estimate<lower_threshold, clock speed is adjusted to the maximum speed.

In the case where there are five thresholds (upper2, upper1, upper_target, lower_target, lower1), where upper2>=upper1>=upper_target>=lower_target>=lower1, the goal of the algorithm for adjusting the clock speed is to keep the power_estimate between lower_target and upper_target thresholds. The algorithm is as follows:

If power_estimate>upper2, clock speed is decreased by DEC2.

If upper2>power_estimate>upper1, clock speed is decreased by DEC1.

If upper 1>power_estimate>upper_target, clock speed is decreased by DEC0.

If upper_target>power_estimate>lower_target, no adjustment is made to clock speed.

If lower_target>power_estimate>lower1, clock speed is increased by INC0.

If lower1>power_estimate, clock speed is increased by INC1.

The power estimates from the power management system 200, 300, 500 may be used in the performance analysis of a computing chip. For example, based on the information obtained through the power monitors 205, 305, 505, the states of the functional blocks, such as idle, active and normal, can be determined. Such information can also be used to understand which functional blocks are heavily used and which functional blocks are bottlenecks.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

What is claimed is:

1. A method of controlling power usage of an electronic device that is governed by a clock, comprising the steps of:
   determining an activity level of at least one functional block of said electronic device based on a number of active flip-flops included in said at least one functional block;
   performing a digital on-chip calculation to derive an estimated power value based on said activity level by calculating a weighted sum of a plurality of flip-flop enable signals as a sum of a value of each said flip-flop enable signal multiplied by a weighting factor associated with the flip-flop enable signal, and wherein each said flip-flop enable signal is associated with a functional block of said at least one functional block, and for each said flip-flop enable signal, the weighting factor associated with the flip-flop enable signal represents the contribution of the functional block associated with the flip-flop enable signal relative to other functional blocks;
   comparing said estimated power value with a threshold power value; and
   decreasing a speed of the clock if said estimated power value is greater than said threshold power value.

2. The method according to claim 1, wherein activity levels of first and second functional blocks of said electronic device are determined during the step of determining, and the estimated power value is derived from said activity levels.

3. The method according to claim 2, wherein the step of deriving comprises applying a first scale factor to the activity level of the first functional block and a second scale factor to the activity level of the second functional block, and summing the scaled activity levels of the first and second functional blocks.

4. The method according to claim 1, further comprising monitoring a set of flip-flop enable signals in said at least one functional block, wherein each said flip-flop enable signal controls the operation of at least one flip-flop included in said at least one functional block.

5. A method of controlling power usage of an electronic device that is governed by a clock, comprising the steps of:
   monitoring a set of flip-flop enable signals in at least one functional block, wherein each said flip-flop enable signal controls the operation of at least one flip-flop included in said at least one functional block, wherein a total number of flip-flop enable signals in said at least one functional block is greater than a number of flip-flop enable signals in said set, and wherein a first enable signal in said set of enable signals is selected based on a number of flip-flops controlled by said first enable signal;
   determining an activity level of said at least one functional block of said electronic device based on a number of active flip-flops included in said at least one functional block;
   performing a digital on-chip calculation to derive an estimated power value based on said activity level;
   comparing said estimated power value with a threshold power value; and
   decreasing a speed of the clock if said estimated power value is greater than said threshold power value.

6. The method according to claim 1, wherein the step of decreasing comprises dividing the speed of the clock by powers of two.

7. The method according to claim 6, wherein the step of dividing the speed of the clock by the powers of two is carried out within a fixed period of time for only a portion of that fixed period.

8. The method according to claim 1, further comprising the steps of comparing a rate of increase of the estimated power value with a threshold rate and notifying a power supply if the rate of increase is greater than the threshold rate.

9. A computer chip comprising:
   a plurality of blocks, each governed by a clock signal and having a plurality of flip-flops;
   a power monitor for performing a digital on-chip calculation to generate an estimate of power usage by said blocks based on a number of active flip-flops in said blocks by calculating a weighted sum of a plurality of flip-flop enable signals as a sum of a value of each said flip-flop enable signal multiplied by a weighting factor associated with the flip-flop enable signal, and wherein each flip-flop enable signal is associated with a functional block of said functional blocks, and for each said flip-flop enable signal, the weighting factor associated with the flip-flop enable signal represents the contribution of the functional block associated with the flip-flop enable signal relative to other functional blocks; and
   a clock manager for generating control inputs to increase or decrease a speed of the clock signal based on said estimate.

10. The computer chip according to claim 9, wherein the power monitor includes:
    for each said block, a summation unit that is coupled to a representative set of flip-flop enable signal lines and outputs a value that is related to the number of flip-flops in said representative set that are active, and a multiplication unit for applying a scale factor to the value output from the summation unit; and
    an additional summation unit for summing the scaled values output from the multiplication units of said blocks.

11. The computer chip according to claim 10, wherein the power monitor further includes a low pass filter for averaging an output of the additional summation unit over a predetermined period of time.

12. The computer chip according to claim 9, wherein the clock manager stores a low threshold value and a high threshold value, and compares said estimate with said low threshold value and said high threshold value.

13. The computer chip according to claim 12, wherein the clock manager outputs the control inputs to increase the speed of the clock signal if said estimate is less than said low threshold value and the control inputs to decrease the speed of the clock signal if said estimate is higher than said high threshold value.

14. The computer chip according to claim 9, further comprising a power supply controller for generating a control input to a power supply based on said estimate.

15. A computing device, comprising:
    a clock source for generating a clock signal;
    a clock divider for adjusting speed of the clock signal based on control inputs;
    a plurality of blocks, at least one of which is governed by the clock signal;
    a power monitor for performing a digital on-chip calculation to generate an estimate of power usage by those blocks that are governed by the clock signal based on a number of active flip-flops in said those blocks calculating a weighted sum of a plurality of flip-flop enable signals as a sum of a value of each said flip-flop enable signal multiplied by a weighting factor associated with the flip-flop enable signal, and wherein each said flip-flop enable signal is associated with a functional block of said at least one functional block, and for each said flip-flop enable signal, the weighting factor associated with the flip-flop enable signal represents the contribution of the functional block associated with the flip-flop enable signal relative to other functional blocks; and a clock manager for generating the control inputs for the clock divider to increase or decrease the speed of the clock signal based on said estimate.

16. The computing device according to claim 15, wherein the clock divider divides the clock signal from the clock source by powers of two and one of the control inputs for the clock divider specifies a power-of-two value to be used by the clock divider.

17. The computing device according to claim 16, wherein another one of the control inputs for the clock divider specifies a period for which the power-of-two division is to be performed by the clock divider.

18. The computing device according to claim 15, wherein one of the blocks is governed by a different clock signal that is generated based on an estimate of power usage by said one of the blocks.

19. The computing device according to claim 18, further comprising another power monitor for generating the estimate of power usage by said one of the blocks.

20. The computing device according to claim 15, wherein the clock manager is configured to compare said estimate with one or more threshold values and generate the control inputs based on the comparison result.

* * * * *